(12) United States Patent
Okada et al.

(10) Patent No.: US 12,167,052 B2
(45) Date of Patent: Dec. 10, 2024

(54) IMAGE PROCESSING DEVICE, IMAGE SENSOR, AND IMAGE PROCESSING DEVICE CONTROL METHOD

(71) Applicant: OMRON Corporation, Kyoto (JP)

(72) Inventors: Naoki Okada, Kyoto (JP); Yusaku Abe, Kyoto (JP); Shohei Nakaoka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/794,055

(22) PCT Filed: Dec. 16, 2020

(86) PCT No.: PCT/JP2020/046906
§ 371 (c)(1),
(2) Date: Jul. 20, 2022

(87) PCT Pub. No.: WO2021/161647
PCT Pub. Date: Aug. 19, 2021

(65) Prior Publication Data
US 2023/0037647 A1    Feb. 9, 2023

(30) Foreign Application Priority Data
Feb. 14, 2020    (JP) ................................. 2020-023190

(51) Int. Cl.
*H04N 21/2343*    (2011.01)
(52) U.S. Cl.
CPC ............................. *H04N 21/2343* (2013.01)

(58) Field of Classification Search
None
See application file for complete search history.

(56) References Cited

U.S. PATENT DOCUMENTS 7,068,316 B1 *  6/2006  Pine ....................... H04N 25/42
                                                      348/E3.018
10,219,014 B2 *  2/2019  Van Dusen ........ H04N 21/2402
(Continued)

FOREIGN PATENT DOCUMENTS

CN    103155585 A    6/2013
CN    108696657 A    10/2018
(Continued)

OTHER PUBLICATIONS

International Search Report issued in Intl. Appln. No. PCT/JP2020/046906 mailed Mar. 2, 2021. English translation provided.
(Continued)

*Primary Examiner* — An Son P Huynh
(74) *Attorney, Agent, or Firm* — ROSSI, KIMMS & McDOWELL LLP

(57) ABSTRACT

An image processor includes an information transmission controller that transmits data including an image of an object and information indicating a result of a process to a terminal through a network. The information transmission controller changes a resolution of a transmission image to be transmitted to the terminal in accordance with at least one of a capability of the terminal, a load status of the terminal, a load status of the network, or a load status of the image processor, and adjusts coordinates on the transmission image at which the information is to be superimposed in accordance with the changed resolution.

11 Claims, 12 Drawing Sheets

(56) References Cited

U.S. PATENT DOCUMENTS

| | | | |
|---|---|---|---|
| 11,082,745 B2* | 8/2021 | Poder | H04N 21/2221 |
| 2006/0107223 A1* | 5/2006 | Mirtich | G06F 3/0481 |
| | | | 715/764 |
| 2007/0157260 A1* | 7/2007 | Walker | H04N 21/47214 |
| | | | 725/86 |
| 2009/0128839 A1* | 5/2009 | Mori | H04N 1/40068 |
| | | | 358/1.9 |
| 2009/0154892 A1* | 6/2009 | Taoka | H04N 5/772 |
| | | | 386/338 |
| 2012/0007866 A1 | 1/2012 | Tahan | |
| 2012/0011194 A1 | 1/2012 | Tahan | |
| 2012/0011568 A1 | 1/2012 | Tahan | |
| 2012/0082437 A1* | 4/2012 | Shiomi | H04N 9/87 |
| | | | 386/E5.028 |
| 2012/0174174 A1* | 7/2012 | Ozawa | H04L 67/565 |
| | | | 725/110 |
| 2013/0024501 A1 | 1/2013 | Tahan | |
| 2013/0031582 A1* | 1/2013 | Tinsman | H04N 21/4316 |
| | | | 725/36 |
| 2013/0293675 A1* | 11/2013 | Iwasaki | H04N 13/161 |
| | | | 348/43 |
| 2014/0038514 A1* | 2/2014 | Robbins | H04N 21/440218 |
| | | | 455/3.06 |
| 2014/0040496 A1* | 2/2014 | Moorthy | H04L 65/80 |
| | | | 709/231 |
| 2016/0092751 A1* | 3/2016 | Zavesky | G06T 7/194 |
| | | | 382/205 |
| 2017/0023492 A1* | 1/2017 | Olsson | H04N 23/58 |
| 2017/0032501 A1* | 2/2017 | Kusumi | G06T 5/73 |
| 2017/0353748 A1* | 12/2017 | Van Dusen | H04N 21/234381 |
| 2018/0063422 A1* | 3/2018 | Liu | H04N 23/90 |
| 2018/0173379 A1* | 6/2018 | Schwartz | H04L 67/025 |
| 2018/0285041 A1 | 10/2018 | Yasui | |
| 2019/0146883 A1* | 5/2019 | Miyazaki | H04N 21/816 |
| | | | 709/219 |
| 2019/0158815 A1* | 5/2019 | He | H04N 21/234327 |
| 2019/0191203 A1* | 6/2019 | Asbun | H04N 21/6587 |
| 2019/0197356 A1* | 6/2019 | Kurita | G06F 18/214 |
| 2019/0215650 A1* | 7/2019 | Marino | H04N 21/2662 |
| 2019/0222739 A1* | 7/2019 | Yang | H04N 25/57 |
| 2019/0304082 A1 | 10/2019 | Tokashiki et al. | |
| 2020/0013195 A1 | 1/2020 | Kim et al. | |
| 2020/0053281 A1 | 2/2020 | Sugioka et al. | |
| 2020/0242796 A1* | 7/2020 | Yamada | G06F 18/26 |
| 2020/0304752 A1* | 9/2020 | Aluru | H04N 7/0117 |
| 2021/0118108 A1* | 4/2021 | Noble | G06V 10/25 |
| 2022/0247925 A1 | 8/2022 | Sugioka et al. | |
| 2022/0377349 A1* | 11/2022 | Otsuka | H04N 19/146 |

FOREIGN PATENT DOCUMENTS

| | | |
|---|---|---|
| CN | 110301137 A | 10/2019 |
| JP | 2006171850 A | 6/2006 |
| JP | 2006279893 A | 10/2006 |
| JP | 2009047446 A | 3/2009 |
| JP | 2016072686 A | 5/2016 |
| JP | 2017117115 A | 6/2017 |
| JP | 2019175406 A | 10/2019 |
| WO | 2012147535 A1 | 11/2012 |
| WO | 2017155126 A1 | 9/2017 |
| WO | 2018174311 A1 | 9/2018 |

OTHER PUBLICATIONS

Written Opinion issued in Intl. Appln. No. PCT/JP2020/046906 mailed Mar. 2, 2021. English translation provided.

Office Action issued in Chinese Appln. No. 202080094318.4, mailed Dec. 5, 2023. English translation provided.

* cited by examiner

FIG. 11A

| Screen size of operation terminal | Image resolution (reduction ratio) |
|---|---|
| Less than 7 in | 1／3 |
| 7 to less than 10 in | 1／2 |
| 10 in or greater | 1／1 |

FIG. 11B

| CPU load of operation terminal | Image resolution (reduction ratio) |
|---|---|
| Less than 50% | 1／1 |
| 50 to less than 70% | 1／3 |
| 70% or greater | 1／5 |

FIG. 11C

| Network load (response time) | Image compression | Transmission rate |
|---|---|---|
| Less than 100 ms | Unused | Normal |
| 100 ms to less than 1 s | Used (at low compression ratio) | Halved |
| 1 s or greater | Used (at high compression ratio) | Halved |

FIG. 11D

| | Image resolution (reduction ratio) | |
|---|---|---|
| Network load (response time) | Image processor under high load | Image processor under low load |
| Less than 100 ms | 1／2 | 1／1 |
| 100 ms or greater | 1／4 | 1／2 |

FIG. 11E

| Web browser | Image format |
|---|---|
| Chrome | WebP |
| Internet Explorer | BMP |
| Safari | PNG |

FIG. 12A

| Priority for screen update rate | | | Image format | Reduction ratio of image | Transmission rate |
|---|---|---|---|---|---|
| Image processor load | CPU usage | Less than 50% | - | 1/1 | Normal |
| | | 50 to less than 70% | - | 1/3 | Normal |
| | | 70% or greater | - | 1/5 | Normal |
| Network load | Response time | Less than 1 s | - | 1/1 | Normal |
| | | 1 s or greater | - | 1/1 | Normal |
| Operation terminal capability | Browser | Chrome | WebP | 1/1 | Normal |
| | | IE | BMP | 1/1 | Normal |
| | | Edge | BMP | 1/1 | Normal |
| | | FireFox | PNG | 1/1 | Normal |
| | | Opera | PNG | 1/1 | Normal |
| | | Safari | PNG | 1/1 | Normal |
| | Screen size | Less than 7 in | - | 1/3 | Normal |
| | | 7 to less than 10 in | - | 1/2 | Normal |
| | | 10 in or greater | - | 1/1 | Normal |
| Operation terminal load | CPU usage | Less than 50% | - | 1/1 | Normal |
| | | 50 to less than 70% | - | 1/3 | Normal |
| | | 70% or greater | - | 1/5 | Normal |

FIG. 12B

| Priority for image quality | | | Image format | Reduction ratio of image | Transmission rate |
|---|---|---|---|---|---|
| Image processor load | CPU usage | Less than 50% | - | 1/1 | Normal |
| | | 50 to less than 70% | - | 1/1 | Normal |
| | | 70% or greater | - | 1/2 | Halved |
| Network load | Response time | Less than 1 s | - | 1/1 | Normal |
| | | 1 s or greater | - | 1/1 | Halved |
| Operation terminal capability | Browser | Chrome | WebP | 1/1 | Normal |
| | | IE | BMP | 1/1 | Normal |
| | | Edge | BMP | 1/1 | Normal |
| | | FireFox | PNG | 1/1 | Normal |
| | | Opera | PNG | 1/1 | Normal |
| | | Safari | PNG | 1/1 | Normal |
| | Screen size | Less than 7 in | - | 1/1 | Normal |
| | | 7 to less than 10 in | - | 1/1 | Normal |
| | | 10 in or greater | - | 1/1 | Normal |
| Operation terminal load | CPU usage | Less than 50% | - | 1/1 | Normal |
| | | 50 to less than 70% | - | 1/1 | Normal |
| | | 70% or greater | - | 1/2 | Halved |

IMAGE PROCESSING DEVICE, IMAGE SENSOR, AND IMAGE PROCESSING DEVICE CONTROL METHOD

FIELD

The present invention relates to an image sensor used on, for example, factory production lines.

BACKGROUND

Image sensors are widely used on factory production lines to, for example, detect, measure, recognize, or inspect objects using images captured with cameras (refer to Patent Literature 1). Many image sensors have remote access capabilities allowing operators or managers to connect to the image sensors through a network using external operation terminals. The operators or managers can view captured images and the processing results of the images or can configure and maintain the image sensors online (refer to Patent Literature 2).

CITATION LIST

Patent Literature

Patent Literature 1: Japanese Unexamined Patent Application Publication No. 2009-47446
Patent Literature 2: Japanese Unexamined Patent Application Publication No. 2019-175406

SUMMARY

Technical Problem

Recent image sensors can be accessed from various computers that are used as operation terminals, such as personal computers (PCs), tablets, and smartphones. Different operation terminals connected to the same image sensor may have different screen sizes, resolutions, processing powers, or display formats. Different operation terminals may also use transmission paths of various types and bandwidths, such as a local area network (LAN) and a wide area network (WAN) for remote access. The load status of the network varies depending on the number of connected operation terminals, possibly changing the transmission speed between the image sensor and each operation terminal.

Known image sensors transmit images with a constant resolution without particularly reflecting the specifications of each operation terminal or the transmission speed of the network, thus causing image display (frame update) delays or image display failures in some operation terminals. This issue is more apparent for images having a larger data size captured with higher-resolution cameras mounted on the image sensors.

The frame update rate may be guaranteed independently of the specifications of the operation terminals or the transmission speed when the data size of the captured images is reduced by resolution conversion (downsampling) before the images are transmitted to the operation terminals, instead of raw images (specifically, images used in detection, inspection, and other processes) being transmitted to the operation terminals. However, such low-resolution images may be less visible and may have lost useful information through resolution conversion. Thus, captured images are not to undergo resolution conversion when inappropriate (e.g., when the operation terminals have high specifications or the transmission speed is high).

Additionally, the image sensor may have graphics indicating processing results (e.g., recognized characters and figures and measured dimensions and angles) superimposed on an image appearing on the confirmation screen of processing results. However, a low-resolution transmission image may have misalignment between the image and the graphics indicating the processing results. Although such misalignment does not occur for a transmission image including the graphics indicating the processing results synthesized on the image before resolution conversion, the resolution conversion can blur the graphics and greatly reduce the visibility of the processing results.

In response to the above issue, one or more aspects of the present invention are directed to a technique for causing a terminal connectable to an image sensor through a network to display images of an appropriate quality.

Solution to Problem

An image processor according to an aspect of the present disclosure includes an image obtainer that obtains an image of an object, a processing unit that performs a process including at least one of detection, measurement, recognition, or inspection of the object using the image obtained by the image obtainer, and an information transmission controller that transmits data including information indicating a result of the process and the image of the object to a terminal through a network. The information is displayed in a manner superimposed on the image of the object. The information transmission controller changes a resolution of a transmission image being the image of the object to be transmitted to the terminal in accordance with at least one of a capability of the terminal, a load status of the terminal, a load status of the network, or a load status of the image processor, and adjusts coordinates on the transmission image at which the information is to be superimposed in accordance with the changed resolution.

The image processor with this structure changes the resolution of the transmission image in accordance with at least one of the capability of the terminal, the load status of the terminal, the load status of the network, or the load status of the image processor. More specifically, the resolution of the transmission image is changed as appropriate in accordance with a situation (e.g., transmission to a low-spec operation terminal or a component being in a high load status), instead of being changed to the same level for each transmission. The resolution of the image may rather be unchanged when changing the resolution is inappropriate. This allows image display of an appropriate quality that is balanced between the frame update rate and the image quality in accordance with, for example, the capability of the operation terminal and the load status.

Additionally, any transmission image with its resolution changed can have the information indicating the processing results aligned with the image. The processing results can thus be appropriately superimposed on the transmission image with any resolution, allowing any terminal to display the processing results correctly.

The information indicating the processing results may be synthesized onto the transmission image at the terminal or at the image processor. When the information is synthesized at the terminal, the information transmission controller may transmit data including the transmission image, the information, and the coordinates at which the information is to be superimposed to the terminal through the network to cause the terminal to perform a process of superimposing the information on the transmission image. When the information is synthesized at the image processor, the information transmission controller may generate composite image data including the transmission image and the information superimposed on the transmission image and transmit the composite image data to the terminal through the network.

The information transmission controller may change the number of transmission images transmitted per unit time in accordance with at least one of the capability of the terminal, the load status of the terminal, the load status of the network, or the load status of the image processor. The number of transmissions per unit time, or more specifically, the frame update rate of the transmission images, can also be changed as appropriate in accordance with a situation (e.g., transmission to a low-spec operation terminal or a component being in a high load status) to allow image display of an appropriate quality that is balanced between the frame update rate and the image quality. The change in the resolution of the transmission image and the change in the frame update rate can be controlled independently of each other, one at a time or both at the same time.

The information transmission controller may change at least whether to use a compressed transmission image or a compression ratio of the transmission image in accordance with at least one of the capability of the terminal, the load status of the terminal, the load status of the network, or the load status of the image processor. The information transmission controller may also change whether to use a compressed transmission image or the compression ratio of the transmission image as appropriate in accordance with a situation (e.g., transmission to a low-spec operation terminal or a component being in a high load status) to allow image display of an appropriate quality that is balanced between the frame update rate and the image quality. The change in the compression of the transmission image can be controlled independently of the resolution change or the frame update rate change. Any one or any combination of the changes may be performed.

The information and the transmission image may be displayed by a web browser at the terminal. The use of the web browser eliminates the development of an application program for terminals, thus reducing development costs, as well as eliminating installation of an application program into terminals and allowing use of any device incorporating a web browser as a terminal for display. However, different types or versions of web browsers may use different image formats for display. The information transmission controller may change a format of the transmission image in accordance with at least a type or a version of the web browser at the terminal.

The information transmission controller may control information transmission to the terminal based on a correspondence table defining correspondence between at least one of the capability of the terminal, the load status of the terminal, the load status of the network, or the load status of the image processor and at least one of the resolution of the transmission image, the number of transmission images transmitted per unit time, whether to use a compressed transmission image, or a compression ratio of the transmission image. The information transmission controller may include a plurality of correspondence tables and control information transmission to the terminal using a correspondence table selected by a user of the terminal from the plurality of correspondence tables. The user can easily switch between displays as appropriate in accordance with the purpose or the use with correspondence tables prepared for various condition settings, such as a setting with higher priority for the transmission image quality (resolution) or a setting with higher priority for the frame update rate of the transmission images. This improves user convenience.

An image sensor according to another aspect of the present disclosure includes an imaging unit that captures an image of an object, and the above image processor that performs a process using the image received from the imaging unit.

A method for controlling an image processor according to another aspect of the present disclosure is a method for controlling an image processor including a processing unit that performs a process including at least one of detection, measurement, recognition, or inspection of an object using an image of the object. The image processor transmits, to a terminal through a network, data including the image of the object and information indicating a result of the process to be displayed in a manner superimposed on the image of the object. The method includes changing a resolution of a transmission image being the image of the object to be transmitted to the terminal in accordance with at least one of a capability of the terminal, a load status of the terminal, a load status of the network, or a load status of the image processor, adjusting coordinates on the transmission image at which the information is to be superimposed in accordance with the changed resolution, and transmitting data including the transmission image with the changed resolution and the information with the adjusted coordinates to the terminal through the network.

A program according to another aspect of the present disclosure is a program for causing a processor to perform the changing, the adjusting, and the transmitting included in the above method. The processor is included in the image processor.

One or more aspects of the present invention may be directed to an image processor including at least one of the above components, an image sensor including an imaging unit that captures an image of an object and an image processor including at least one of the above components, or an image sensor system that includes the image sensor and a terminal. One or more aspects of the present invention may be directed to a method for controlling an image processor, an image processing method, or an image transmission method including at least part of the above processes or to a program for implementing any of these methods or a non-transitory storage medium storing the program. The above components and processes may be combined with one another in any manner to form one or more aspects of the present invention.

Advantageous Effects

The structure according to the above aspects of the present invention causes a terminal connectable to the image sensor through a network to display images of an appropriate quality.

BRIEF DESCRIPTION OF THE DRAWINGS

FIGS. 11A to 11E are example correspondence tables.

FIG. 12A is a diagram of an example correspondence table with higher priority set for a screen update rate, and FIG. 12B is a diagram of an example correspondence table with higher priority set for an image quality.

DETAILED DESCRIPTION

An image sensor system in one or more embodiments will now be described in detail with reference to the drawings.
<Example Use>

Figure 1:
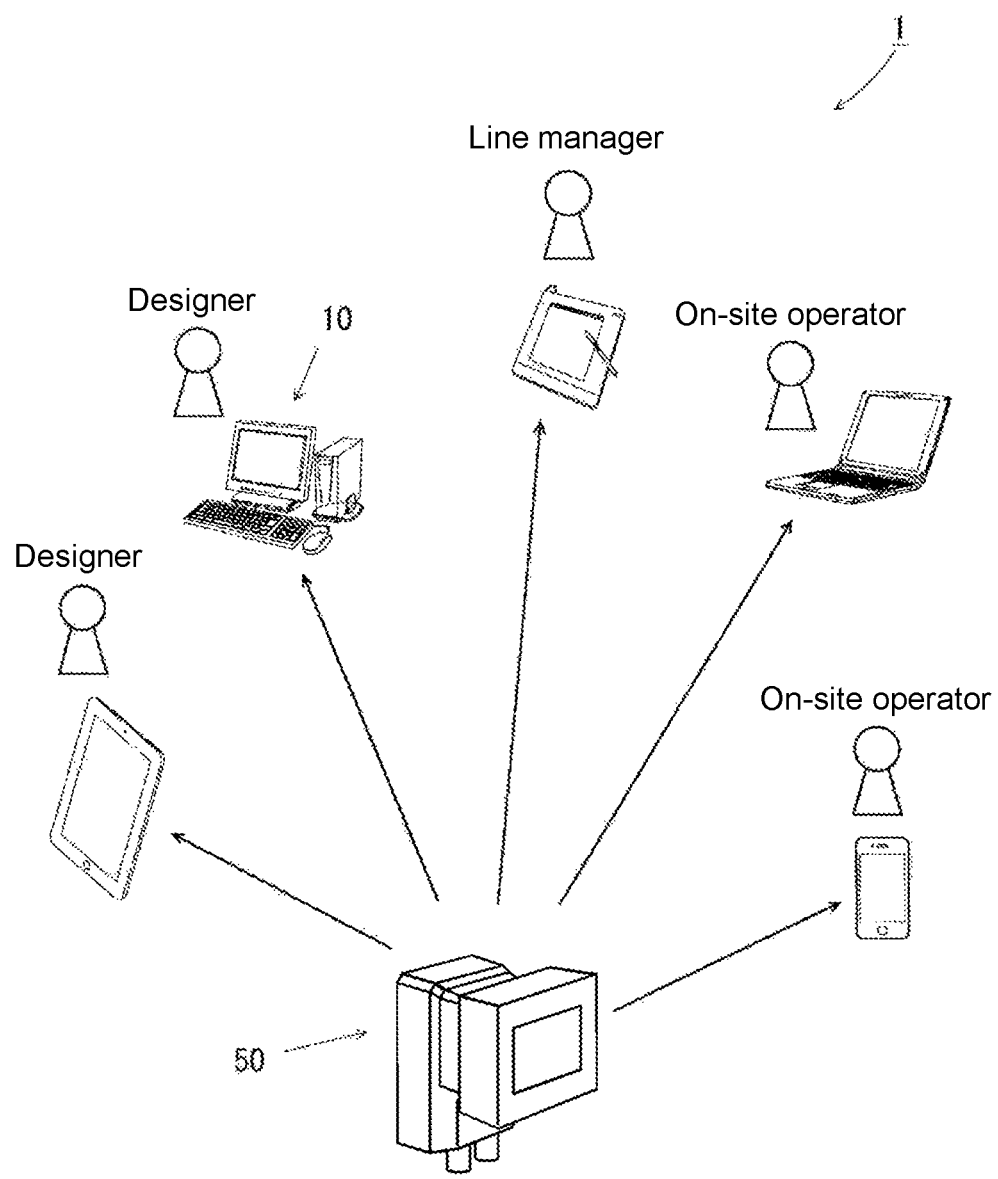
FIG. 1 is a diagram of an example image sensor system.

An example use of the image sensor system in one or more embodiments of the present invention will now be described. As shown in FIG. 1, an image sensor system 1 includes one or more image sensors 50 and one or more operation terminals 10. The image sensor system 1 is used in factory automation (FA) to monitor, manage, or control production lines. In the embodiment described below, the designer of an image sensor 50, the line manager of the production line using the image sensor 50, and an on-site operator who, for example, adjusts the image sensor 50 and views the processing results at the production line site access the image sensor 50 using different operation terminals 10 to browse the images and processing results of an object.

The image sensor 50 is installed on, for example, a factory production line and used in various image-based processes. The image sensor 50 is also referred to as, for example, a vision sensor or a vision system. For example, the image sensor 50 detects, measures, recognizes, or inspects objects, or more specifically, detects objects on conveyors or trays, records images of objects, recognizes shapes, detects edges and measures the widths and number of edges, measures areas, measures the number of objects, obtains color features, or performs labeling, segmentation, object recognition, barcode and two-dimensional (2D) code reading, optical character recognition (OCR), or individual identification. The image sensor 50 mainly includes an imaging unit (camera) and an image processor. The image processor controls the camera, performs image processing (e.g., pre-processing or feature extraction) on image data received from the camera, performs various processes (e.g., inspection, character recognition, or individual identification) based on the results of the image processing, transmits and receives data to and from the operation terminals 10, processes data received from the operation terminals 10, and generates data to be output to the operation terminals 10.

Each operation terminal 10 is an external device for accessing the image sensor 50. Examples of the operation terminals include PCs, tablets, and smartphones. The image processor in the present embodiment allows remote access with a web server. Each operation terminal 10 uses a web browser to allow browsing of information and use of various functions provided by the image sensor 50 (image processor). Various functions available on the operation terminals 10 are enabled by HyperText Markup Language (HTML) and JavaScript. Thus, any device incorporating a web browser, including the operation terminals 10, can use the remote access function of the image sensor 50 without installation of a dedicated application program.

In this system, various types of operation terminals 10 may access the image sensor 50 through various networks. The operation terminals 10, which are general-purpose devices, may have their resources allocated to processes other than remote access. The image sensor 50 in operation is to perform their main processes (detection, measurement, recognition, or inspection of objects) with higher priority, without the remote access process interfering with the main processes. Thus, the image sensor 50 (image processor) in the present embodiment adaptively changes, for example, the resolution of a transmission image to be transmitted to the operation terminals 10, the number of transmission images transmitted per unit time (frame update rate), the use or non-use of a compressed transmission image, or the compression ratio of the transmission image in accordance with at least one of the capability of each operation terminal 10, the load status of each operation terminal 10, the load status of the network, or the load status of the image processor. The image sensor 50 thus allows image display of an appropriate quality that is balanced between the frame update rate and the image quality in accordance with, for example, the capability of each operation terminal 10 and the load status of each operation terminal 10, the network, or the image processor.

The image sensor 50 displays graphics indicating the processing results (e.g., recognized characters and figures and measured dimensions and angles) superimposed on the image appearing on the confirmation screen of the processing results. The image sensor 50 in the present embodiment may transmit a transmission image with the resolution being changed to the operation terminals 10, instead of transmitting the captured image (specifically, the image used for detection, measurement, recognition, or inspection). In this case, the image sensor 50 aligns the graphics indicating the processing results with the transmission image with the changed resolution. The resolution-changed transmission image can thus have the graphics indicating the processing results superimposed appropriately on the display image, allowing any types of operation terminals 10 to correctly display the processing results.

EMBODIMENTS (Configuration of Image Sensor System)

Figure 2:
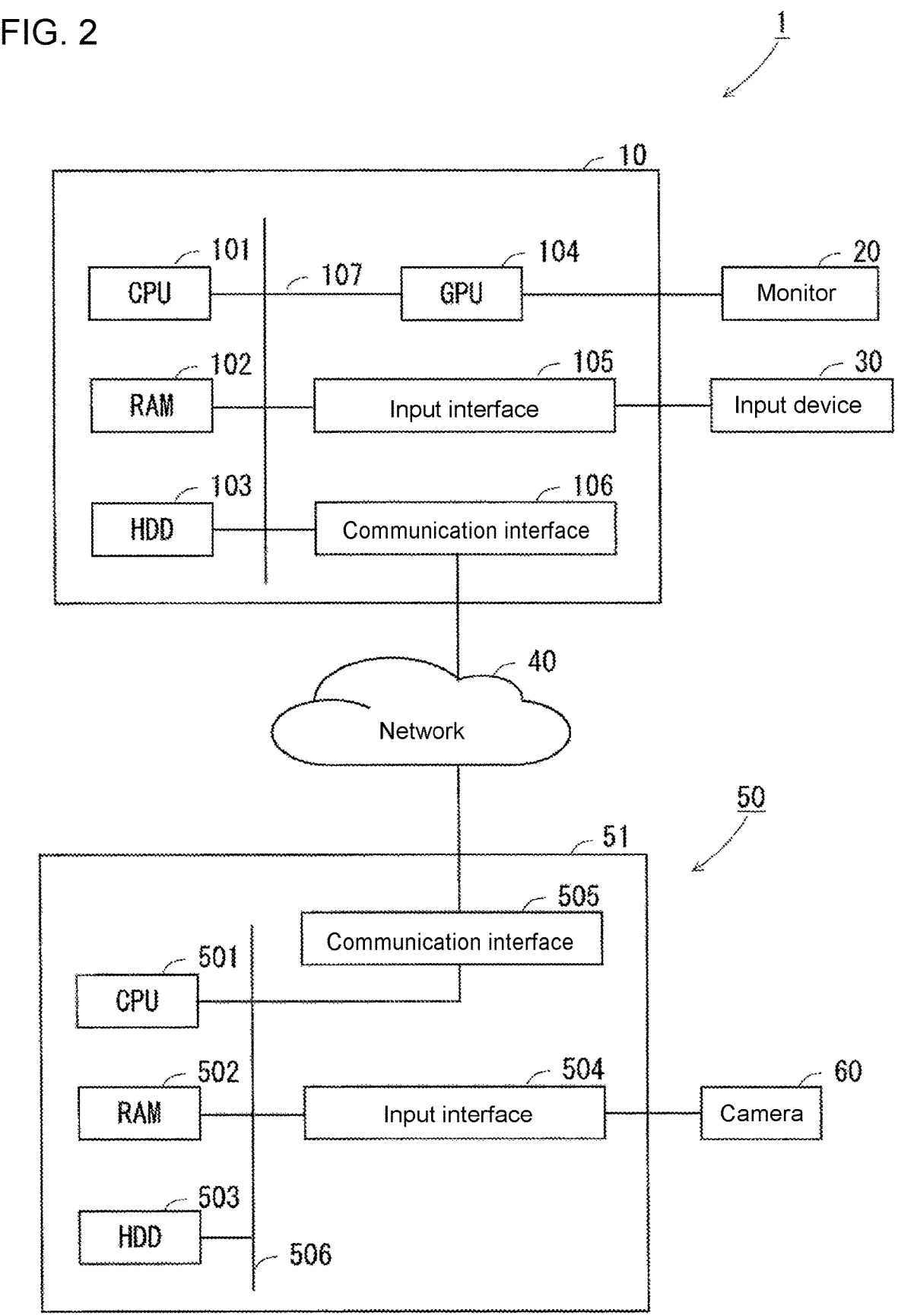
FIG. 2 is a diagram of an image sensor and an operation terminal showing the hardware configuration.

The image sensor system 1 in one or more embodiments of the present invention will now be described. As shown in FIG. 2, the image sensor system 1 includes one or more operation terminals 10 and one or more image sensors 50. The operation terminals 10 and the image sensors 50 are connected to one another through a network 40.

Each operation terminal 10 includes a central processing unit (CPU) 101, a random-access memory (RAM) 102, a hard disk drive (HDD) 103, a graphics processing unit (GPU) 104, an input interface 105, and a communication interface 106. The GPU 104 is connected to a monitor 20. The input interface 105 is connected to an input device 30. The communication interface 106 is connected to the network 40. The CPU 101, the RAM 102, the HDD 103, the GPU 104, the input interface 105, and the communication interface 106 are connected to one another with a bus 107. Each image sensor 50 includes an image processor 51 and a camera (imaging unit) 60. The image processor 51 includes a CPU 501, a RAM 502, an HDD 503, an input interface 504, and a communication interface 505. The input interface 504 is connected to the camera 60. The CPU 501, the RAM 502, the HDD 503, the input interface 504, and the communication interface 505 are connected to one another with a bus 506.

The hardware configuration shown in FIG. 2 is a mere example. The HDDs may be, for example, replaced by other storages such as solid state drives (SSDs). The image processor 51 may include a GPU, or the operation terminal 10 may eliminate the GPU. A touch panel display or other devices may be used to serve as both the monitor 20 and the input device 30.

In the present embodiment, the CPU 101 in the operation terminal 10 loads various programs stored in the HDD 103 into the RAM 102 and executes the programs to perform the various processes described below. Similarly, the CPU 501 in the image sensor 50 loads various programs stored in the HDD 503 into the RAM 502 and executes the programs to perform the various processes described below. Some or all of the functions enabled by the CPUs 101 and 501 may be implemented with, for example, an application-specific integrated circuit (ASIC) or a field-programmable gate array (FPGA) or provided from external devices such as a cloud server.

(Configuration of Image Processor)

Figure 3:
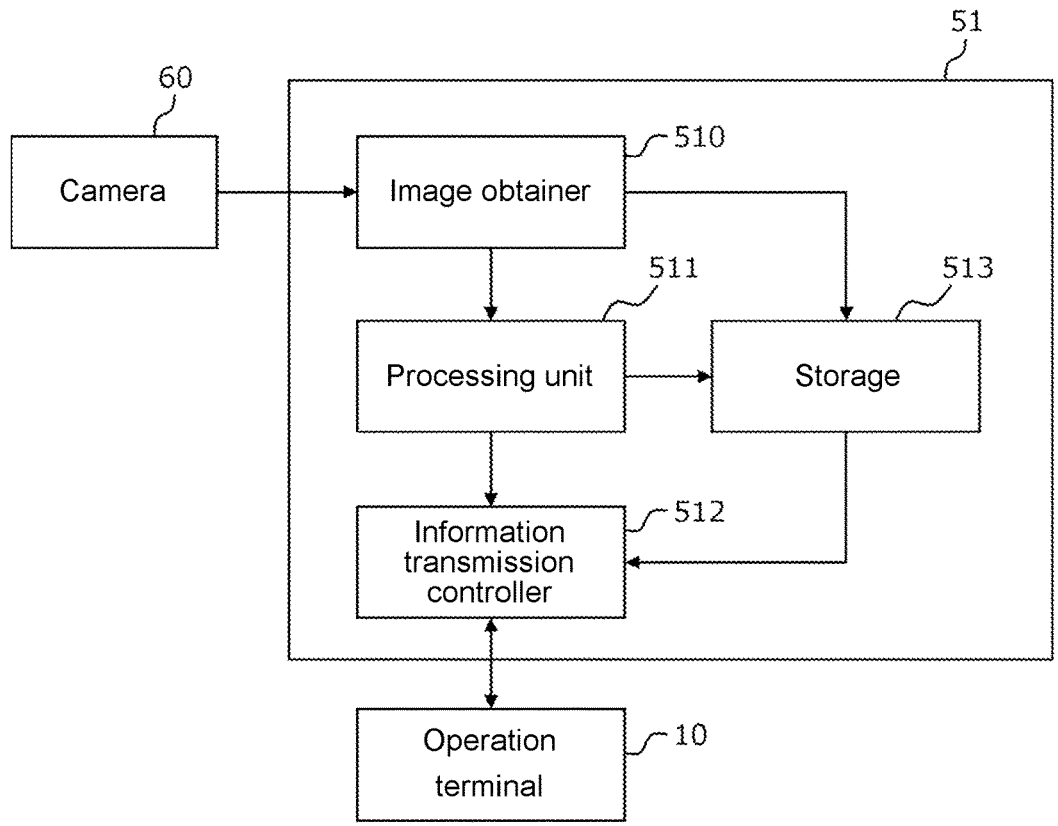
FIG. 3 is a diagram of an image processor showing its functional components.

FIG. 3 is a functional block diagram of the image processor 51 included in the image sensor 50. The image processor 51 includes an image obtainer 510, a processing unit 511, an information transmission controller 512, and a storage 513. The image obtainer 510 obtains an image of an object from the camera 60. The processing unit 511 performs, using the image of the object obtained by the image obtainer 510, main processes of the image sensor such as detection, measurement, recognition, and inspection of the objects. The user can set the details and the procedures of the processes to be performed by the processing unit 511 using the operation terminal 10. The information transmission controller 512 controls transmission of information to the operation terminal 10. For example, the information transmission controller 512 transmits, to the operation terminal 10, data including information indicating the results of processing performed by the processing unit 511 and the image of the object and causes a web browser of the operation terminal 10 to display the data. The storage 513 is a memory that stores image data obtained by the image obtainer 510 and data indicating the results of the processing performed by the processing unit 511.

Figure 4:
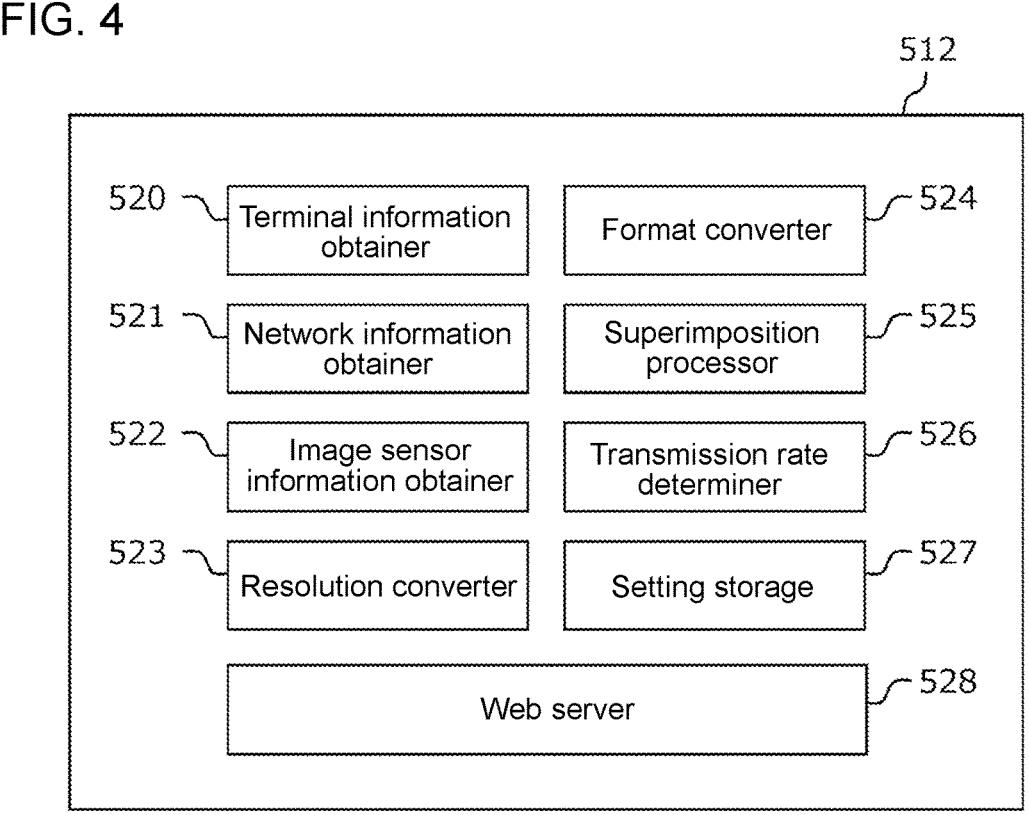
FIG. 4 is a diagram of an information transmission controller showing its detailed components.

FIG. 4 is a diagram of the information transmission controller 512 showing its detailed components. The information transmission controller 512 includes a terminal information obtainer 520, a network information obtainer 521, an image sensor information obtainer 522, a resolution converter 523, a format converter 524, a superimposition processor 525, a transmission rate determiner 526, a setting storage 527, and a web server 528.

The terminal information obtainer 520 obtains information about the operation terminal 10. The information about the operation terminal 10 may include, for example, information about the user operating the operation terminal 10 (user accessing the image sensor 50), information about the capabilities (specifications) of the operation terminal 10, and information about the load status of the operation terminal 10. The network information obtainer 521 obtains information about the transmission path between the operation terminal 10 and the image sensor 50. Information about the transmission path may include, for example, information about the load status of the transmission path, information about the network addresses of the operation terminal 10 and the image sensor 50, and information about the communication protocol. The image sensor information obtainer 522 obtains information about the image sensor 50 (the image sensor 50 including the image sensor information obtainer 522). The information about the image sensor 50 may include, for example, information about the load status of the image processor 51 and the operating mode (status such as being in operation or in maintenance) of the image sensor 50.

The resolution converter 523 performs resolution conversion (mainly downsampling) of images. Any algorithm can be used for resolution conversion. For example, a simple thinning process or interpolation such as bilinear or bicubic may be used. The format converter 524 changes the image format. For example, the format converter 524 can perform interconversion of image formats such as bitmap (BMP), Portable Network Graphics (PNG), WebP, and Joint Photographic Experts Group (JPEG). The format converter 524 can also perform image compression as well as image format conversion. For any format that uses lossy compression such as WebP or JPEG, the compression ratio can be specified.

The superimposition processor 525 superimposes (overlays) information indicating processing results (hereafter referred to as graphics) on the transmission image to be transmitted to the operation terminal 10. The graphics may be synthesized onto the transmission image at the operation terminal 10 or at the image processor 51. When the graphics are synthesized at the operation terminal 10, the superimposition processor 525 generates graphics data and superimposition information defining the positions (coordinates on the transmission image) at which the graphics are to be superimposed. When the graphics are synthesized at the image processor 51, the superimposition processor 525 generates graphics data and the superimposition information and then generates composite image data including the transmission image and the graphics superimposed on the transmission image. For the transmission image having the resolution changed by the resolution converter 523, the superimposition processor 525 adjusts the positions at which the graphics are to be superimposed and the sizes of the graphics (e.g., the size of line art and the font size of text) in accordance with the changed resolution of the transmission image, thus avoiding misalignment between the transmission image and the graphics.

The setting storage 527 stores correspondence tables defining correspondence between at least one of the capability of the operation terminal, the load status of the operation terminal, the load status of the network, or the load status of the image processor 51 and at least one of the resolution of the transmission image, the number of transmission images transmitted per unit time, use or non-use of a compressed transmission image, or the compression ratio of the transmission image. The correspondence tables may be preset before shipment of the image sensor 50 or may be added or revised by the user.

The web server 528 allows the operation terminal 10 to remotely access the image sensor 50 using a web browser. For example, the operation terminal 10 remotely accessing the image sensor 50 can display the image processed by the image sensor 50 and the processing results, allow viewing or changing of the setting of the image sensor 50, and allow registration and testing of a procedure.

(Operation of Image Sensor System)

An example remote access operation performed in the image sensor system 1 in the present embodiment will now be described with reference to FIGS. 5 and 6. In the procedure shown in FIGS. 5 and 6, the operation terminal 10 accesses the image sensor 50 in operation to display images being processed by the image sensor 50 and their processing results for viewing with the operation terminal 10.

Figure 5:
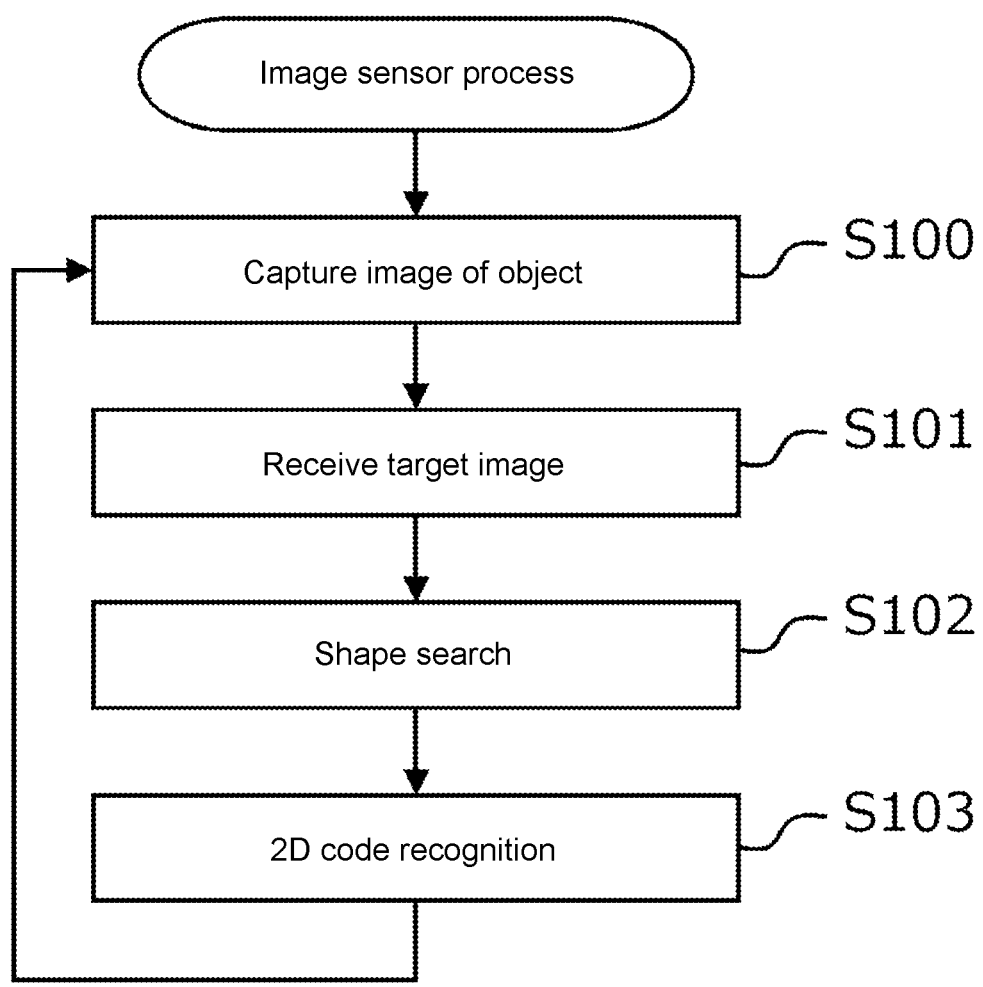
FIG. 5 is a flowchart of an example process performed by the image sensor.

FIG. 5 is a flowchart of a shape search and 2D code recognition as an example process performed by the image sensor 50. The shape search is a process of detecting a predetermined shape (e.g., a pattern, a mark, or unevenness) on the surface of an object by pattern matching with a preregistered shape model. The 2D code recognition is a process of reading a 2D code printed on the surface of an object and recognizing the information encoded in the 2D code.

In step S100, the camera 60 captures an image of an object. In step S101, the image obtainer 510 receives the image (hereafter referred to as a target image) from the camera 60. The target image is stored in the storage 513. In step S102, the processing unit 511 performs pattern matching on the target image to detect any shape that matches the model. In response to the detection being successful, the detected position (xy coordinates in the target image), the detected size (the number of pixels in vertical and horizontal directions), the rotation angle (angle relative to the model), and other information items are recorded in the storage 513 as processing results. In step S103, the processing unit 511 recognizes the 2D code in the target image. In response to the recognition being successful, the detected position of the 2D code, the detected size, the decoded character string, and other information items are recorded in the storage 513 as processing results. The processing in steps S100 to S103 is repeatedly performed in predetermined cycles (e.g., 30 fps).

Figure 6:
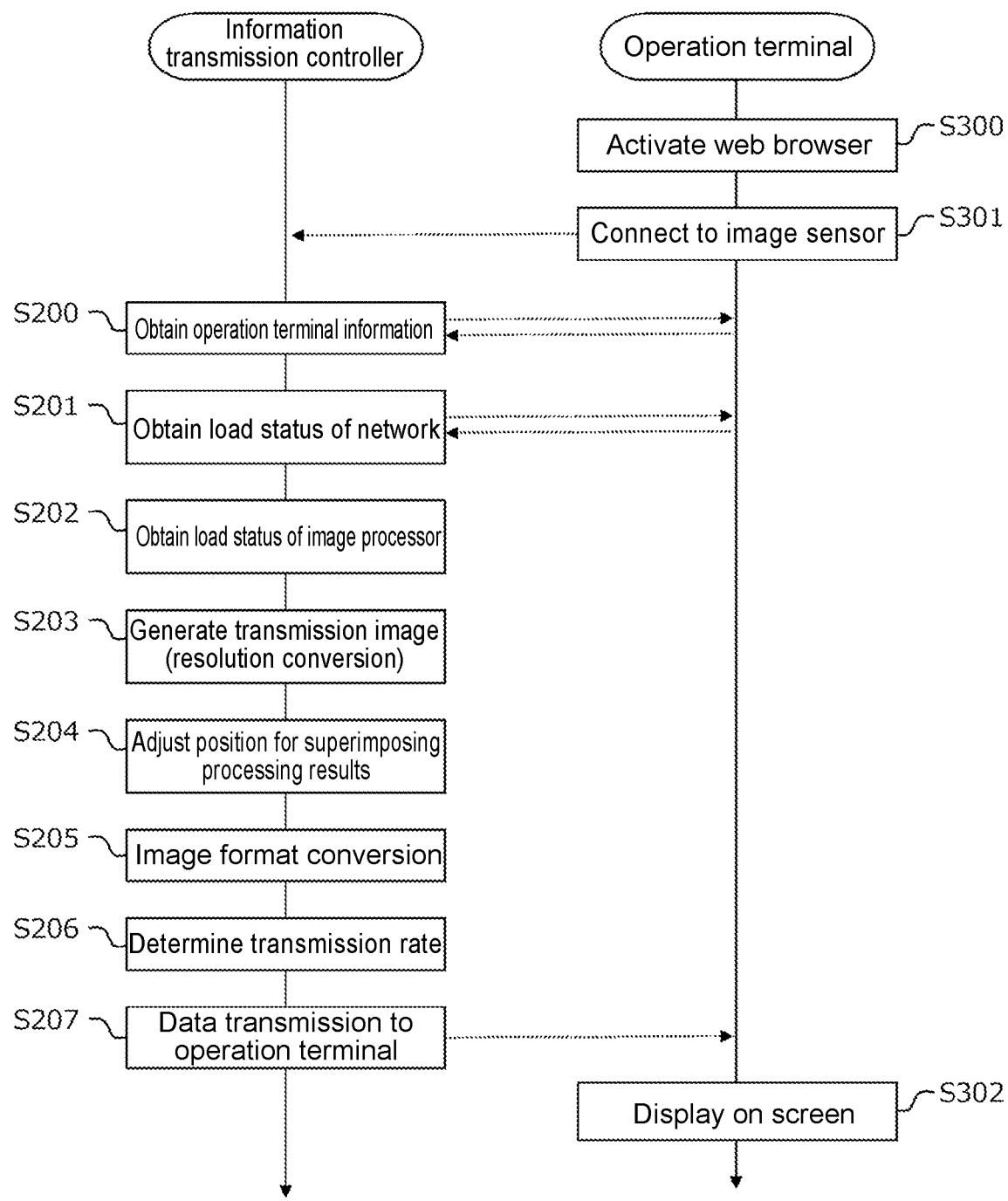
FIG. 6 is a flowchart of an example remote access process performed by the information transmission controller and the operation terminal.

FIG. 6 is a flowchart of a remote access process performed by the information transmission controller 512 included in the image sensor 50 and the operation terminal 10.

In step S300, the user operates the operation terminal 10 and activates the web browser. Examples of the web browser mainly include, but are not limited to, Internet Explorer, Microsoft Edge, Mozilla Firefox, Google Chrome, Opera, and Safari.

In step S301, the user enters the IP address of the image sensor 50 (image processor 51) into the address bar of the web browser and connects to the image sensor 50. Instead of entering the IP address, the user may enter the uniform resource locator (URL) assigned to the image sensor 50 (image processor 51) or select a bookmark preregistered in the web browser.

In step S200, upon receiving access from the operation terminal 10, the terminal information obtainer 520 obtains operation terminal information from the operation terminal 10. The operation terminal information may include, for example, the IP address of the operation terminal 10, the host name of the operation terminal 10, and information about the capabilities (specifications) of the operation terminal 10. The capabilities (specifications) of the operation terminal 10 include, for example, the operating system (OS) of the operation terminal 10, the type and the version of the web browser of the operation terminal 10, the screen size (screen resolution) of the operation terminal 10, the window size of the web browser, and the availability of a GPU. The operation terminal information may also include the load status of the operation terminal 10 (e.g., usage of the CPU, the memory, and other resources) and user information identifying the user using the operation terminal 10 (e.g., a user account or a user category such as a designer, a manager, or an on-site operator). The terminal information obtainer 520 may obtain the operation terminal information from a user agent included in a Hypertext Transfer Protocol (HTTP) request or with JavaScript, for example.

In step S201, the network information obtainer 521 obtains the load status of the network between the operation terminal 10 and the image processor 51. For example, the network information obtainer 521 may determine the network load status by transmitting a command to the operation terminal 10 and measuring the time taken to receive a response from the operation terminal 10.

In step S202, the image sensor information obtainer 522 obtains the load status of the image processor 51. For example, the image sensor information obtainer 522 may obtain the CPU usage of the image processor 51 and determine the load status of the image processor 51 based on the CPU usage.

In step S203, the resolution converter 523 determines the size (reduction ratio) of the transmission image to be transmitted to the operation terminal 10 based on the information obtained in steps S200 to S202 and a correspondence table in the setting storage 527. For example, an operation terminal 10 with a small screen or a small web-browser window can have a small maximum size for displaying images. The reduction ratio of the transmission image is thus determined in accordance with the screen size or the window size. The operation terminal 10 operating under high load may take longer time to render the image to be displayed. The reduction ratio of the transmission image may thus be determined in accordance with the load status. For the network under high load or the image processor 51 under high load, the size of the transmission image may also be reduced. In the present embodiment, the target image captured with the camera 60 is reduced with the reduction ratio that is an integer fraction of the default size of the image. The reduction ratio may be, for example, 1/1, 1/2, 1/3, or 1/4. This allows image reduction through a simple thinning process and shortens the processing time for resolution conversion. Once the reduction ratio is determined, the resolution converter 523 reads the target image from the storage 513 and performs thinning (when appropriate) to generate the transmission image.

Figure 7:
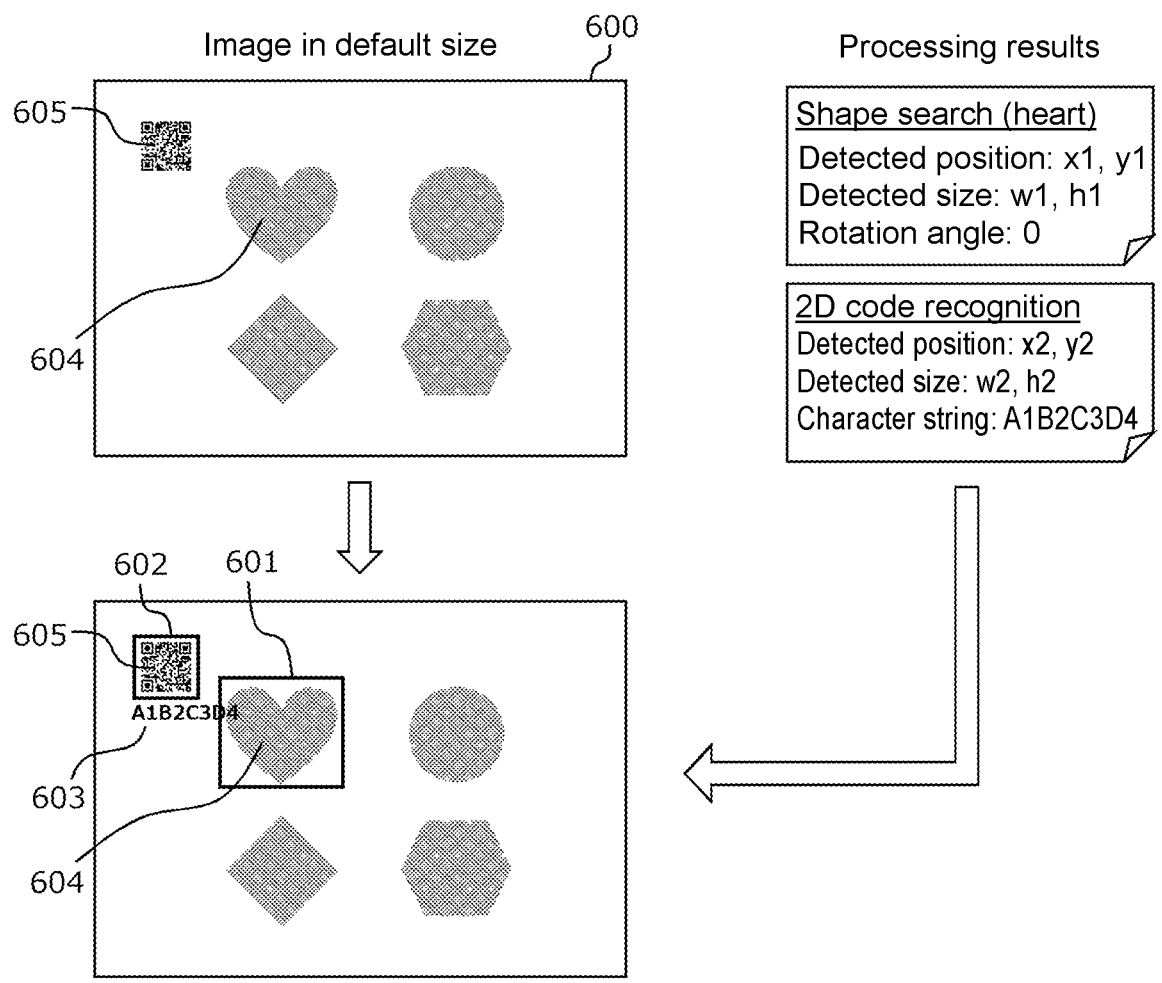
FIG. 7 is a diagram of an example image in its default size, on which processing results are superimposed.
Figure 8:
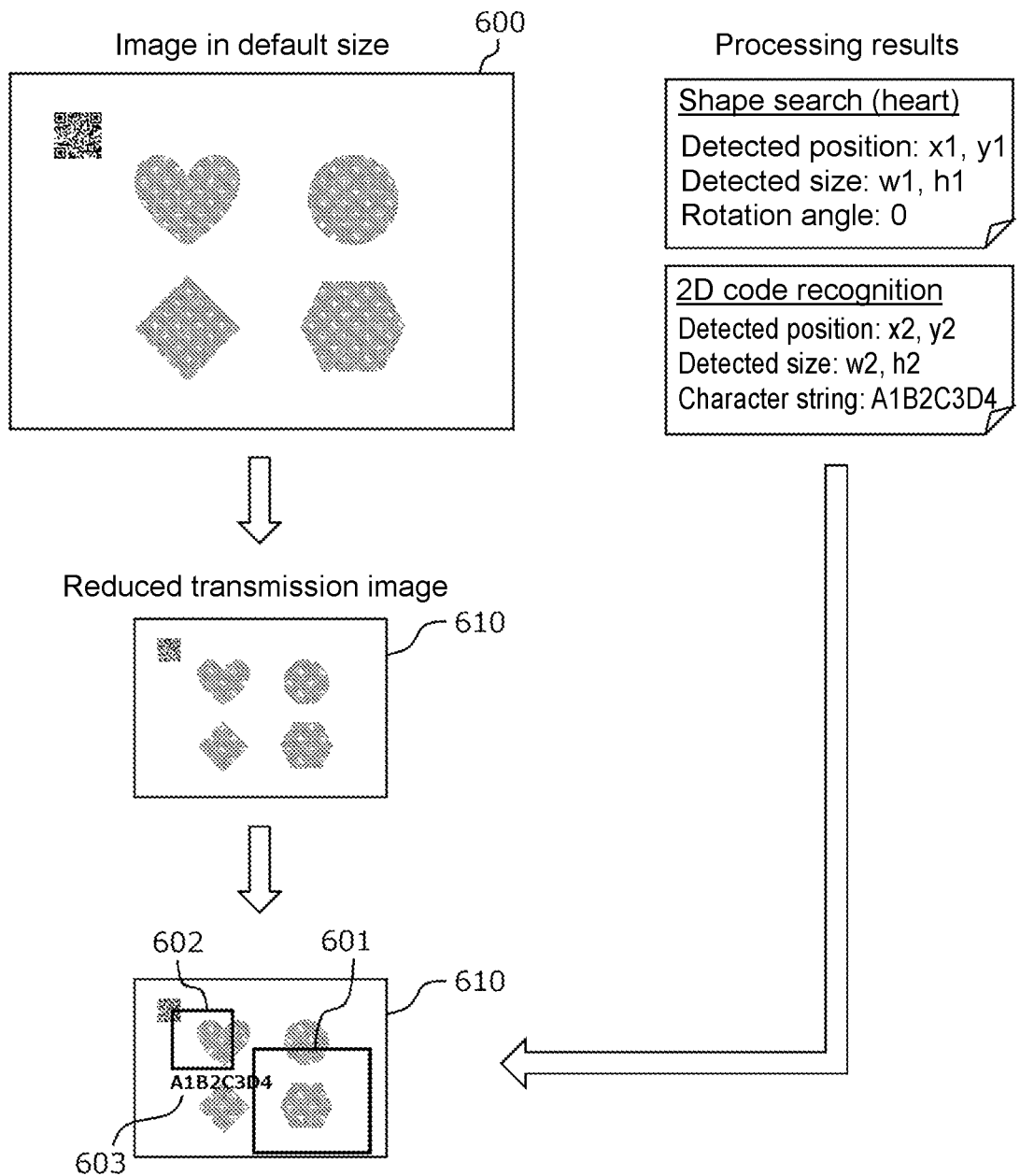
FIG. 8 is a diagram of an example image in a reduced size, on which processing results are superimposed without being aligned with the image.

In step S204, the superimposition processor 525 adjusts the position at which the processing results are to be superimposed based on the resolution of the transmission image. FIG. 7 is a diagram of an example image 600 in its default size, on which graphics 601, 602, and 603 indicating the processing results are superimposed. The graphic 601 is a frame showing the detection result of the shape search, with the detected position and the size of the heart region 604. The graphic 602 is a frame showing a 2D code 605 read in 2D code recognition, and the graphic 603 is a character string decoded from the 2D code 605. For the image 600 in the default size, the graphics 601 and 602 in about the same sizes as the detected shapes are drawn at the coordinates of the positions detected in the shape search and the 2D code recognition. This allows the graphics 601 and 602 to be precisely placed over the heart region 604 and the 2D code 605 in the image 600. However, for a transmission image 610 resulting from the size reduction of the target image 600 as in FIG. 8, the graphics 601 to 603 drawn based on the detected positions and sizes in the shape search and the 2D code recognition are not placed in position in the image 610.

Figure 9:
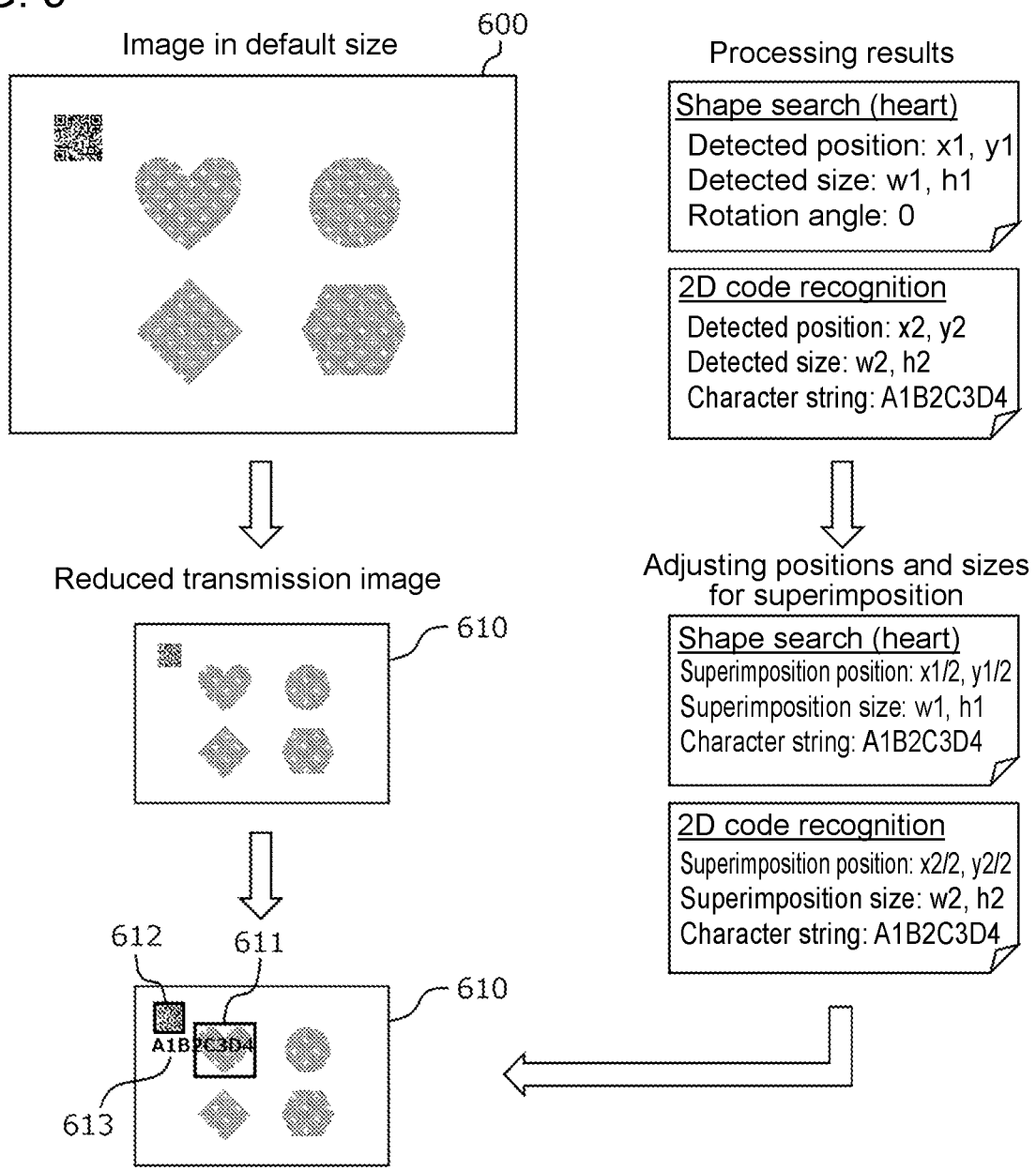
FIG. 9 is a diagram of an example image superimposed with processing results with their positions and sizes adjusted in accordance with the reduction ratio of the image.

Thus, as shown in FIG. 9, the superimposition processor 525 adjusts the positions at which graphics 611 to 613 are to be superimposed and the sizes of the graphics 611 to 613 in accordance with the reduction ratio of the transmission image 610. For example, for the detected position (x1, y1) and the detected size of (w1, h1) obtained from the shape search and for the reduction ratio being 1/2 for the transmission image 610, the graphic 611 is superimposed at a position (x1/2, y1/2) with a size of (w1/2, h1/2).

In step S205, the format converter 524 determines the image format of the transmission image to be transmitted to the operation terminal 10 based on the information obtained in steps S200 to S202 and a correspondence table in the setting storage 527 and performs format conversion when appropriate. For example, different web browsers have their respective image formats. The image format may thus be selected based on the type of web browser. More specifically, WebP may be selected for Chrome, BMP for Internet Explorer and Microsoft Edge, and PNG for FireFox, Opera, and Safari. For the network operating under high load, the data size of the transmission image may be reduced by selecting an image format with compression. In this case, the network operating under higher load may use higher compression ratios.

In step S206, the transmission rate determiner 526 determines the transmission rate of transmission images (the number of images transmitted per unit time) based on the information obtained in steps S200 to S202 and a correspondence table in the setting storage 527. For example, for lower load (normal state), the transmission rate may be set to update the frame of the operation terminal 10 in synchronization with the processing cycle of the image sensor 50. For higher load, the transmission rate may be halved.

In step S207, the web server 528 transmits, to the operation terminal 10, data including the transmission image, the graphics, and information indicating the coordinates to superimpose the graphics generated in steps S203 to S205. In step S302, the web browser in the operation terminal 10 displays, based on the received data, a screen including the transmission image on which the graphics are superimposed. The data transmitted from the web server 528 may include data about the processing results (e.g., detected position, detected size, or character string) and the overall determination result about the inspection (pass or acceptable/fail or defective).

Figure 10:
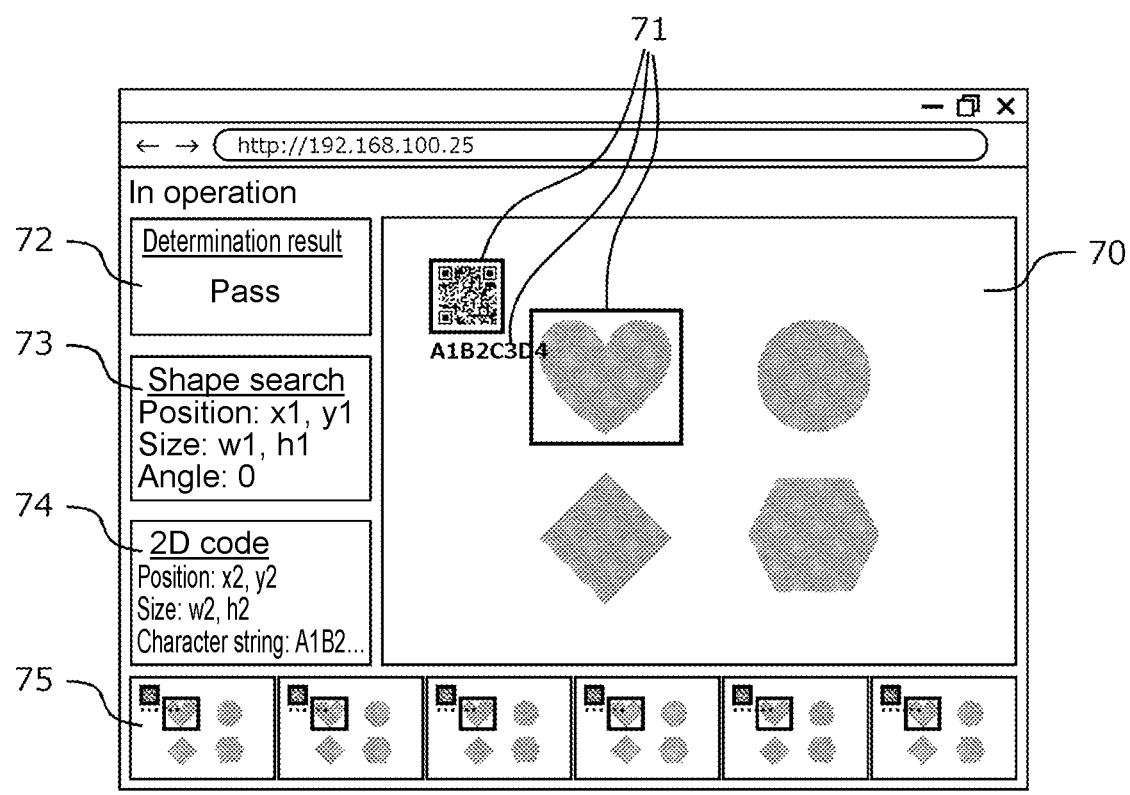
FIG. 10 is a diagram of an example display screen of a web browser.

FIG. 10 is a diagram of an example display screen of the web browser in the operation terminal 10. The main window on the display screen displays a transmission image 70 on which graphics 71 indicating the processing results are superimposed. The windows on the left of the main window display, from top to bottom, an overall determination result 72, shape search processing results 73, and 2D code recognition processing results 74. The bottom windows below the main window display history 75 (past frames) of transmission images and processing results in chronological order. This history view is also referred to as a filmstrip view.

The processing in steps S201 to S207 is repeated in cycles at the transmission rate determined in step S206. The operation terminal 10 updates the frame (updates the transmission image 70 and the graphics 71 indicating the processing results) in synchronization with the cycle. The user monitoring this screen can view the image obtained by the image sensor 50 and its processing results almost in real time.

(Example Correspondence Tables)

FIGS. 11A to 11E show example correspondence tables registered in the setting storage 527. FIG. 11A shows a table defining the correspondence between the screen size of the operation terminal 10 and the resolution (reduction ratio) of the transmission image. Although the example table in FIG. 11A specifies the physical screen size, the screen size may be specified using the resolution of the screen, instead of the physical size. FIG. 11B shows a table defining the correspondence between the CPU load of the operation terminal 10 and the resolution (reduction ratio) of the transmission image. FIG. 11C shows a table defining the correspondence between the network load (response time), use or non-use of a compressed transmission image and the compression ratio of the transmission image, and the transmission rate. For lower network load, uncompressed images are transmitted at a normal transmission rate. For higher network load, images are compressed to reduce the data size, or the transmission rate may be halved. FIG. 11D shows a table defining the correspondence between the combination of network load and the load of the image processor 51 and the image resolution (reduction ratio). FIG. 11E shows a table defining the correspondence between web browsers and image formats.

The correspondence tables listed above are mere examples. Items to be combined or set values can be defined as appropriate. Any table may be used that defines correspondence between set values of at least one or more of the type of the OS of the operation terminal 10, the type and/or the version of the web browser, the screen size of the operation terminal 10, the window size of the web browser, availability of a GPU, the CPU usage and/or the memory usage of the operation terminal 10, the load status of the network, or the CPU usage and/or the memory usage of the image processor 51 and set values of one or more of the resolution (reduction ratio) of a transmission image, the number of transmission images transmitted per unit time (transmission rate), the use or non-use of a compressed transmission image and/or the compression ratio of the transmission image, or the format of the transmission image.

Figure 13:
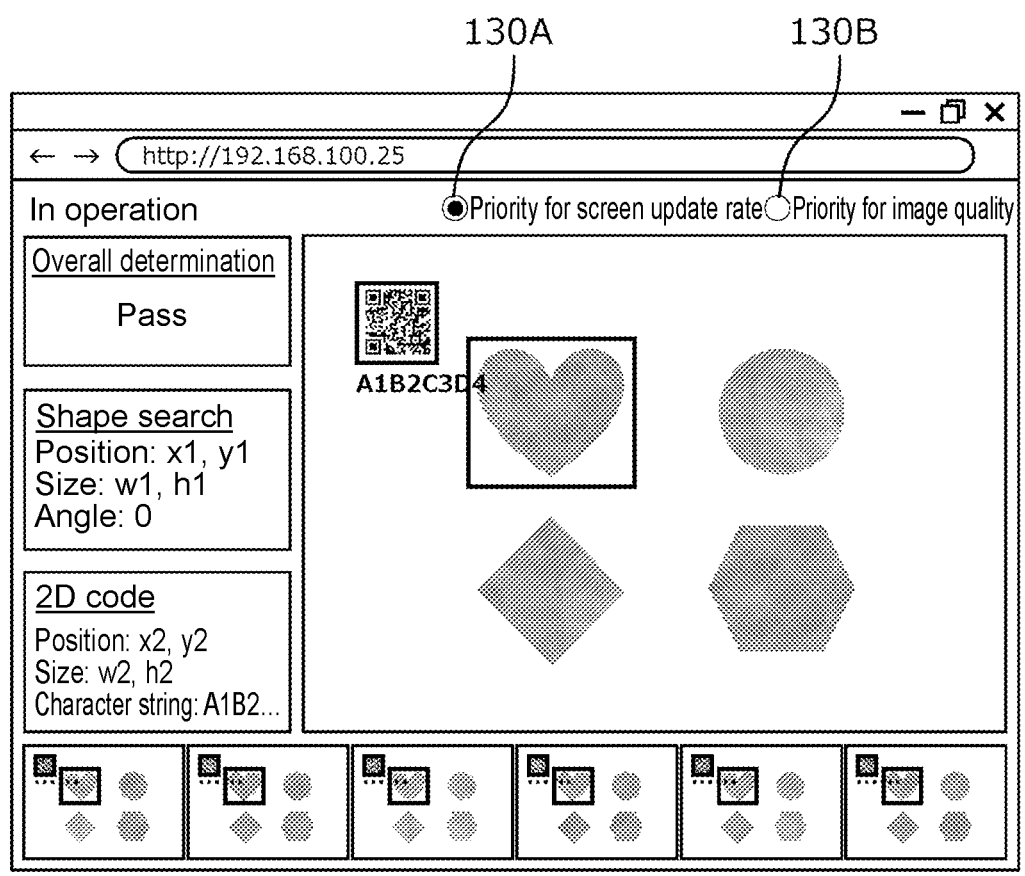
FIG. 13 is a diagram of an example graphical user interface (GUI) for selection of a correspondence table.

Multiple correspondence tables with different set values may be registered in the setting storage 527 to allow the user of the operation terminal 10 to select a correspondence table to be used. FIGS. 12A and 12B show example two correspondence tables with different set values. FIG. 12A shows a correspondence table with higher priority set for the screen update rate than for the display image quality (resolution). FIG. 12B is a correspondence table with higher priority set for the display image quality (resolution) than for the screen update rate. FIG. 13 is a diagram of an example graphical user interface (GUI) for selection of a correspondence table. The user can selectively switch between the update rate priority mode (using the correspondence table in FIG. 12A) and the image quality priority mode (using the correspondence table in FIG. 12B) by pressing a radio button 130A or a radio button 130B. The user may select between three or more correspondence tables, rather than between two.

(Others)

The embodiment described above is a mere example of the present invention and does not limit the image sensor system in the embodiment of the present invention to the specific configuration described above. The present invention is not limited to the embodiment described above, but may be modified variously within the scope of the technical ideas of the invention. The present invention may be implemented as appropriate using the structure specific to each embodiment and may be variously modified or altered.

In the above embodiment, the results of the shape search and 2D code recognition are superimposed on the image, for example. However, the image sensor 50 may perform other processes and the operation terminal 10 may use the display screen in different manners. For example, the image intensity distribution (white balance) may be superimposed, the shading waveform (line brightness) of RGB may be superimposed, or the inspection area, detection results (e.g., edges), OCR results, inspection results, or measurement results (e.g., dimensions, area, or angle) may be superimposed. Although the screen of the image sensor 50 in operation is illustrated in the above embodiment (FIGS. 10 and 13), the image sensor 50 during maintenance may also be accessed for setting the details and procedures of the process to be performed by the image sensor 50 and for performing operation tests. In such a case as well, images and processing results are transmitted from the image sensor 50 to the operation terminal 10. The resolution and the transmission rate of the transmission image may thus be controlled as appropriate in accordance with the capability and the load status of the operation terminal 10 as well as the load status of the network or the image processor, as in the above embodiment.

<Appendix 1>

An image processor (51), comprising:
an image obtainer (510) configured to obtain an image of an object;
a processing unit (511) configured to perform a process including at least one of detection, measurement, recognition, or inspection of the object using the image obtained by the image obtainer (510); and
an information transmission controller (512) configured to transmit data including information indicating a result of the process and the image of the object to a terminal (10) through a network,
wherein the information (71) is displayed in a manner superimposed on the image (70) of the object, and
the information transmission controller (512) changes a resolution of a transmission image being the image of the object to be transmitted to the terminal (10) in accordance with at least one of a capability of the terminal (10), a load status of the terminal (10), a load status of the network, or a load status of the image processor (51), and adjusts coordinates on the transmission image at which the information is to be superimposed in accordance with the changed resolution.

<Appendix 2>

A method for controlling an image processor (51),
the image processor (51) including a processing unit (511) configured to perform a process including at least one of detection, measurement, recognition, or inspection of an object using an image of the object, the image processor (51) being configured to transmit, to a terminal (10) through a network, data including the image of the object and information indicating a result of the process to be displayed in a manner superimposed on the image of the object,
the method comprising:
changing (S203) a resolution of a transmission image being the image of the object to be transmitted to the terminal (10) in accordance with at least one of a capability of the terminal (10), a load status of the terminal (10), a load status of the network, or a load status of the image processor (51);
adjusting (S204) coordinates on the transmission image at which the information is to be superimposed in accordance with the changed resolution; and
transmitting (S207) data including the transmission image with the changed resolution and the information with the adjusted coordinates to the terminal (10) through the network.

REFERENCE SIGNS LIST

1: Image Sensor System
10: Operation Terminal
50: Image Sensor
51: Image Processor
60: Camera

The invention claimed is:

1. An image sensor that is usable on a factory production line and connectable, through a network, to a terminal equipped with a monitor, the image sensor comprising:
an imaging unit configured to capture an image of an object; and
an image processor, the image processor comprising a memory storing instructions and a central processing unit (CPU) configured to execute the instructions stored in the memory to implement:
an image obtainer configured to obtain the image of the object from the imaging unit;
a processing unit configured to perform a process including at least one of detection, measurement, recognition, or inspection of the object using the image obtained by the image obtainer; and
an information transmission controller configured to transmit data including information indicating a result of the process and the image of the object to the terminal through the network,
wherein the information and the image of the object are configured to be displayed on the monitor of the terminal in a manner that the information is superimposed on the image of the object, and
the information transmission controller (i) obtains a usage of the CPU of the image processor of the image sensor and (ii) changes a resolution of a transmission image, being the image of the object, to be transmitted to the terminal in accordance with at least the obtained usage of the CPU of the image processor of the image sensor, which is a transmitting side of the transmission image, and adjusts coordinates on the transmission image at which the information is to be superimposed in accordance with the changed resolution.

2. The image sensor according to claim 1, wherein
the information transmission controller transmits data including the transmission image, the information, and the coordinates at which the information is to be superimposed to the terminal through the network to cause the terminal to perform a process of superimposing the information on the transmission image.

3. The image sensor according to claim 1, wherein
the information transmission controller generates composite image data including the transmission image and the information superimposed on the transmission image and transmits the composite image data to the terminal through the network.

4. The image sensor according to claim 1, wherein
the information transmission controller changes a number of transmission images transmitted per unit time in accordance with at least one of a capability of the terminal, a load status of the terminal, a load status of the network, or the obtained usage of the CPU of the image processor.

5. The image sensor according to claim 1, wherein
the information transmission controller changes at least whether to use a compressed transmission image or a compression ratio of the transmission image in accordance with at least one of a capability of the terminal, a load status of the terminal, a load status of the network, or the obtained usage of the CPU of the image processor.

6. The image sensor according to claim 1, wherein
the information and the transmission image are displayable by a web browser at the terminal, and
the information transmission controller changes a format of the transmission image in accordance with at least a type or a version of the web browser at the terminal.

7. The image sensor according to claim 1, wherein
the information transmission controller controls information transmission to the terminal based on a correspondence table defining a correspondence between at least the obtained usage of the CPU of the image processor and at least one of the resolution of the transmission image, a number of transmission images transmitted per unit time, whether a compressed transmission image is to be used, or a compression ratio of the transmission image.

8. The image sensor according to claim 7, wherein
the information transmission controller includes a plurality of correspondence tables, and controls information transmission to the terminal using a correspondence table selected by a user of the terminal from the plurality of correspondence tables.

9. The image sensor according to claim 1, wherein the information transmission controller changes the resolution of the transmission image in accordance with the obtained usage of the CPU of the image processor as well as at least one of a capability of the terminal, a load status of the terminal, or a load status of the network.

10. A method for controlling an image sensor that is usable on a factory production line and connectable, through a network, to a terminal equipped with a monitor, the image sensor including an imaging unit configured to capture an image of an object and an image processor, the image processor including a memory storing instructions and a central processing unit (CPU) configured to execute the instructions stored in the memory to implement a processing unit configured to perform a process including at least one of detection, measurement, recognition, or inspection of the object using the image of the object, the image processor being configured to transmit, to the terminal and through the network, data including the image of the object and information indicating a result of the process to be displayed on the monitor of the terminal in a manner that the information is superimposed on the image of the object,
the method comprising:
obtaining a usage of the CPU of the image processor of the image sensor;
changing a resolution of a transmission image, being the image of the object, to be transmitted to the terminal in accordance with at least the obtained usage of the CPU of the image processor of the image sensor, which is a transmitting side of the transmission image;
adjusting coordinates on the transmission image at which the information is to be superimposed in accordance with the changed resolution; and
transmitting data including the transmission image with the changed resolution and the information with the adjusted coordinates to the terminal through the network.

11. A non-transitory computer readable medium storing a program that when executed, executes a method for controlling an image sensor that is usable on a factory production line and connectable, through a network, to a terminal equipped with a monitor, the image sensor including an imaging unit configured to capture an image of an object and an image processor, the image processor including a memory storing instructions and a central processing unit (CPU) configured to execute the instructions stored in the memory to implement a processing unit configured to perform a process including at least one of detection, measurement, recognition, or inspection of the object using the image of the object, the image processor being configured to transmit, to the terminal and through the network, data including the image of the object and information indicating a result of the process to be displayed on the monitor of the terminal in a manner that the information is superimposed on the image of the object,
the method comprising:
obtaining a usage of the CPU of the image processor of the image sensor;
changing a resolution of a transmission image, being the image of the object, to be transmitted to the terminal in accordance with at least the obtained usage of the CPU of the image processor of the image sensor, which is a transmitting side of the transmission image;
adjusting coordinates on the transmission image at which the information is to be superimposed in accordance with the changed resolution; and
transmitting data including the transmission image with the changed resolution and the information with the adjusted coordinates to the terminal through the network.

\* \* \* \* \*